(No Model.)

W. W. ROCHELLE.
Saw Swage.

No. 230,341.  Patented July 20, 1880.

WITNESSES:
Henry N. Miller
C. Sedgwick

INVENTOR:
W. W. Rochelle
BY
ATTORNEYS.

UNITED STATES PATENT OFFICE.

WILLIAM W. ROCHELLE, OF STAR LANDING, MISSISSIPPI.

SAW-SWAGE.

SPECIFICATION forming part of Letters Patent No. 230,341, dated July 20, 1880.

Application filed March 6, 1880. (No model.)

*To all whom it may concern:*

Be it known that I, WILLIAM W. ROCHELLE, of Star Landing, in the county of De Soto and State of Mississippi, have invented a new and useful Improvement in Saw-Swages, of which the following is a specification.

My invention relates to tools for sharpening the teeth of cotton-gin saws, which, by reason of their small size and peculiar shape, cannot be properly sharpened with an ordinary file.

My improved tool is made in three pieces— the sharpening-bit proper, which is shaped at its outer end to enter between the saw-teeth, the head or shank, which is formed to receive and support the bit, and a sliding collar which clamps the bit in the head by a wedging action. These features will be described more particularly with reference to the accompanying drawings, forming part of this specification, wherein—

Figure 1:
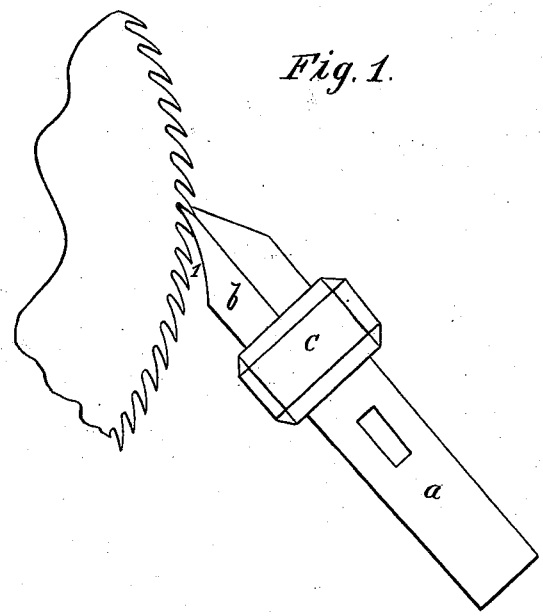
Figure 2:
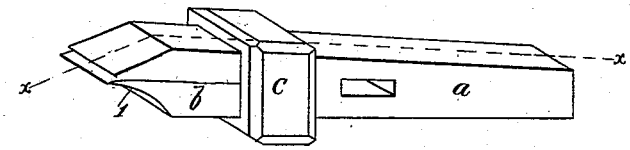
Figure 3:
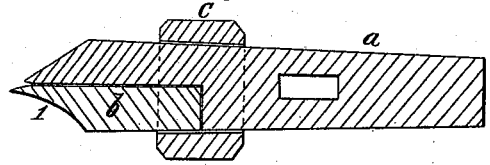

Figure 1 is a side view of the sharpener as applied to use. Fig. 2 is a side perspective view, and Fig. 3 is a longitudinal section on line $x\ x$ of Fig. 2.

Similar letters of reference indicate corresponding parts.

$a$ is the head or handle of the tool, $b$ the bit, and $c$ the clamping-collar. The head $a$ is made of suitable size and length for being conveniently held in the hand, and is beveled to a sharp edge at the forward end and formed with a rabbet to receive the bit $b$, which, when in place, is flush with the bottom and sides of the head. The collar $c$ sets loosely over the head $a$, so as to slide thereon over the bit $b$, and the head $a$ being formed tapering, with the larger portion at the bit end, the collar $c$ clamps the bit and head together with a wedge action. The bit $b$ is beveled at the under side at 1 to form a knife-edge, that extends beyond the end of head $a$. The bevel is concave in conformity with the back of the saw-teeth, so that when inserted between the teeth for sharpening them it will give the required shape to the teeth.

The bit is made of steel tempered to the required hardness.

This construction furnishes a most effective tool for sharpening gin-saws, and the shape given to the teeth is such as to render the saws durable.

The device is to be used to repair old gin-saws and sharpen new ones, the work being done by holding the sharpener across the point of the saw-tooth and striking with a light hammer. This causes the point of the tooth to enter the tool, thereby giving the tooth the shape of a chisel-edge. A fine file is then applied to each side of the saw to relieve it of the burrs which have been formed by the action of the sharpener.

Having thus fully described my invention, I claim as new and desire to secure by Letters Patent—

In gin-saw swages, the removable bit $b$, formed with the concave bevel 1 and fitted in the head $a$, substantially as shown and described.

WILLIAM WILLEY ROCHELLE.

Witnesses:
P. B. JONES,
R. J. DONOVAN.